April 2, 1957  M. H. BECK  2,787,494
ARMREST WITH IMPROVED ATTACHING AND RETAINING MEANS
Filed Oct. 25, 1954
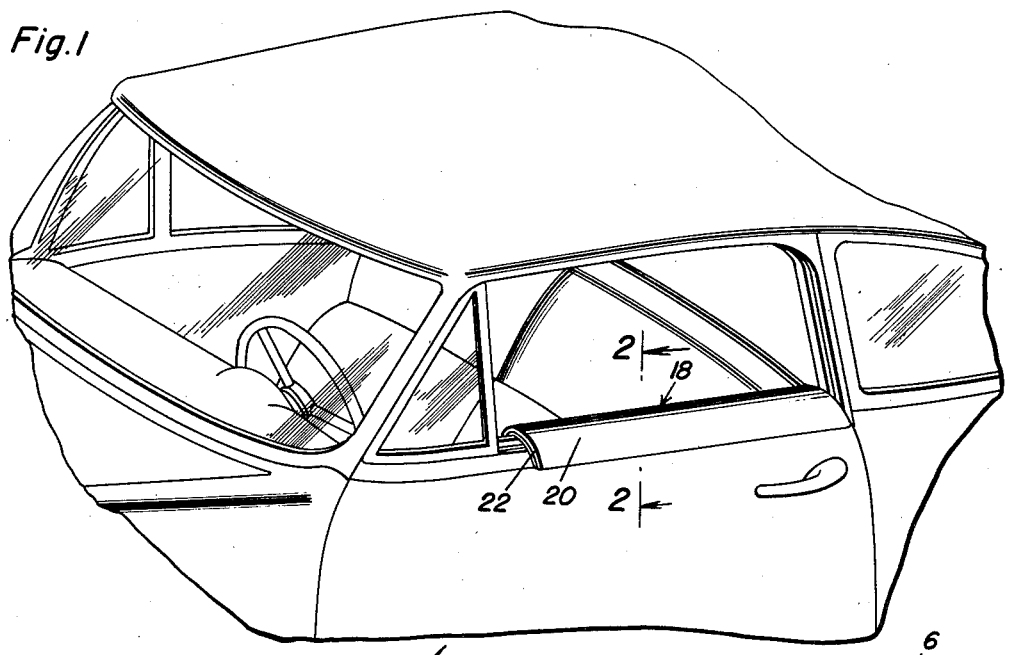
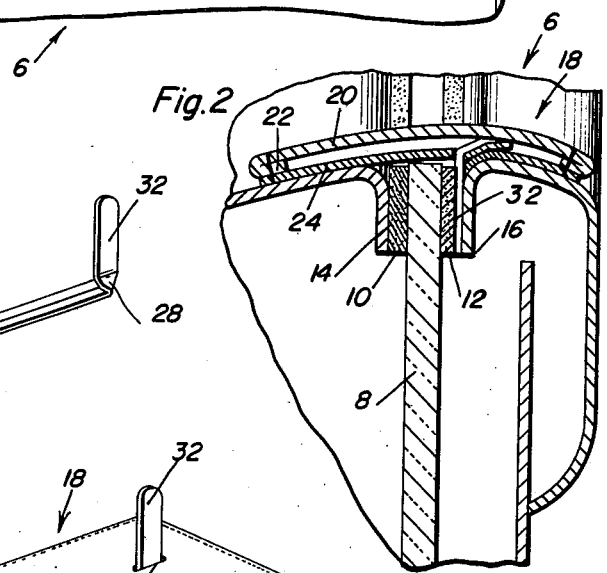
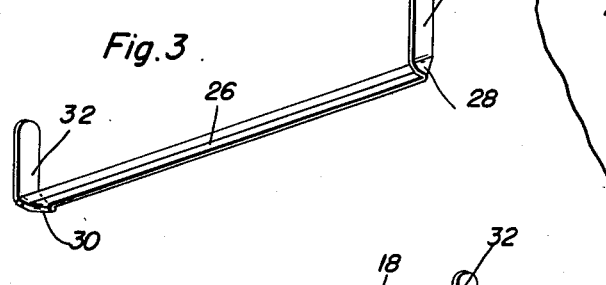
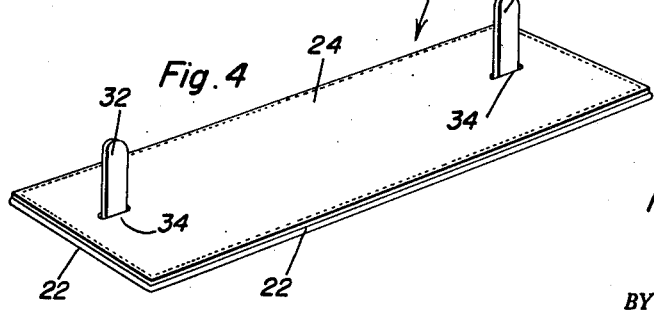
Manuel H. Beck
INVENTOR.

United States Patent Office 2,787,494
Patented Apr. 2, 1957

2,787,494

ARMREST WITH IMPROVED ATTACHING AND RETAINING MEANS

Manuel H. Beck, Phoenix, Ariz., assignor of one-third to Milo H. Beck, Phoenix, and one-third to Donald L. Davis, Temple, Ariz.

Application October 25, 1954, Serial No. 464,517

1 Claim. (Cl. 296—49.2)

The present invention relates to a simple, practical and highly economical arm rest of a type which is fitted handily and conveniently into the window opening in an automobile door and which provides a suitable and acceptable pad for the elbow or forearm of the driver when the window alongside the driver is open, a driving practice followed by many automobile drivers.

Not only is the practice of resting one's arm on the left front door expedient and well known, others than myself have found it desirable to provide a cushioned or equivalent arm rest to comfort the arm of the driver and to reduce to a minimum undue wear on the driver's shirt sleeve or coat sleeve, as the case may be. It is also a matter of common knowledge that in prior art attachment-type arm rests and pads, it has been the customary practice to clip the bottom of the arm rest directly on the liftable and lowerable window pane.

More specifically, reference is made to an arm rest which is the subject matter of my copending application, Serial No. 436,792, filed on June 15, 1954 (now abandoned). Briefly, this has to do with a flexible pad-forming arm rest which rests atop the upper edge of the window glass and in fact is attached thereto by U-shaped hold-down clips. The pad or rest is of a width so that it spans the cooperating marginal edge portion of the door and the slot in which the window glass or panel operates. When the window is rolled up for purposes of closing the window opening, the arm rest goes up with it, and therefore, it is necessary to detach the arm rest. This means that it is therefore necessary to needlessly apply and remove the arm rest.

The object of the instant invention is to structurally, functionally and otherwise improve upon the form of the invention covered in my copending application and any similarly constructed and performing prior art adaptations. To this end, the present invention does not rely upon the glass panel as the anchoring or supporting means for the arm rest. Instead, the arm rest is provided with simple and expedient anchoring clips, said clips being pressed into retaining position in the usual existing window glass cushioning strips or, as they are sometimes called, felts. Therefore, the improvement has to do with a fabric or equivalent pad constituting a suitably proportioned and shaped arm rest with simple prong-like clips for handy anchoring purposes and with the clips offset so that the pad remains in place at all times and allows the glass pane to slide up and down without interference from the arm rest.

Objects, features and advantages in addition to those specified will become apparent from the following description and the accompanying sheet of illustrative drawings.

In the drawings:

Figure 1 is a perspective view revealing a fragmentary portion of an automobile, showing the window in its "down" or "open" position and illustrating the arm rest and the manner in which it is utilized;

Figure 2 is an enlarged fragmentary sectional view on the vertical line 2—2 of Figure 1, looking in the direction of the arrows;

Figure 3 is a perspective view of the metal stay with retaining clips; and

Figure 4 is a perspective view of the arm rest by itself and observing what may be called the bottom or underneath side of the same.

Referring now to the drawings, the automobile door is denoted generally by the numeral 6 and is, of course, representative of any typical door in which a sliding glass pane or equivalent closure 8 is mounted. The "slot" through which the glass panel slides up and down is customarily provided with inner and outer cushioning strips sometimes called felts, and these are seen in Figure 2 and denoted by the numerals 10 and 12, and they cooperate with the flanges 14 and 16 forming the slot or guide for the window glass panel 8. The expression "inner" referring to the felt 12 means the felt which is closest to the driver and is, of course, on the inside of the door. The arm rest attachment is denoted by the numeral 18, and it comprises a fabric or equivalent envelope which is constructed to provide a substantially rectangular flexible suitably cushioned pad or arm rest. Although the envelope may be fabricated from carpet-like material, because it is flexible and tough, it has been found that heavy upholstery material will, of course, do. In any event, the envelope, as a unit, is denoted by the numeral 18, and in carrying out this phase of the invention, the main rectangular piece of fabric is denoted in Figure 2 by the numeral 20, and this has its marginal edges turned in and stitched in place, as at 22. The stitchings pass through the marginal edge portions of the cooperating rectangular piece of fabric 24, and the two pieces of fabric define an envelope. This serves to accommodate the practical and handy metal or equivalent stay or strip 26. This has its ends folded in upon themselves and clinched to provide firm bends 28 and 30, with the free end portions directed laterally and providing suitable anchoring prongs or "clips" 32—32. The clips project through slots or opening 34 provided therefor, as shown in Figure 4, in the piece of fabric 24. In practice, these prong-like retainers are forced down between the flange 16 and felt strip 12, as is clearly brought out in Figure 2. One must make certain that the clips are attached to the so-called inner felt 12 so that while the padded arm rest remains permanently in place, that portion which spans or overlaps the guide slot is free to flap up and down and to allow the window glass to be slid without interference.

It is believed that in addition to being simple and economical, the adaptation herein revealed constitutes that which may be justly endorsed by makers and users.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An attachment for an automobile door and for use in association with the same and the customary sliding glass panel in said door, said attachment comprising an elongated bag-like pad of carpet-like fabric embodying upper and lower plies, said plies being marginally stitched together and the lower ply having two pre-formed openings therein, said openings being located just inwardly of the respective transverse ends of said pad, said lower ply, except for said openings, being otherwise imperforate a relatively narrow substantially rigid stay interposed and residing between the inner opposed surfaces of the respective plies and having laterally bent and twisted ends providing retaining prongs, said prongs extending downwardly through and beyond the openings in said bottom ply so that they may be temporarily connected with an existing part of the door in a manner to permit said pad to remain in place on the intended surfaces of the door while allowing the window glass to slide freely up and down, said stay being of a width appreciably less than one-half portion of said pad and confined to a position inwardly of one longitudinal edge and to one side of the longitudinal center of said pad, and said prongs constituting means whereby said stay is attached to said bottom ply.

References Cited in the file of this patent

UNITED STATES PATENTS

| | | |
|---|---|---|
| D. 171,190 | Blumenthal | Dec. 29, 1953 |
| 1,962,508 | Josselyn | June 12, 1934 |
| 2,274,026 | Allen | Feb. 24, 1942 |
| 2,536,895 | West | Jan. 2, 1951 |
| 2,601,052 | Ortleb | June 17, 1952 |
| 2,670,235 | Susil | Feb. 23, 1954 |
| 2,738,220 | Simmons | Mar. 13, 1956 |